United States Patent
Chehab

(10) Patent No.: US 9,631,513 B2
(45) Date of Patent: Apr. 25, 2017

(54) VIBRATION OPTIMIZED ROTOR AND A METHOD FOR PRODUCING A VIBRATION OPTIMIZED ROTOR

(71) Applicant: Siemens Energy, Inc., Orlando, FL (US)

(72) Inventor: Tarik Chehab, Oviedo, FL (US)

(73) Assignee: SIEMENS ENERGY, INC., Orlando, FL (US)

(*) Notice: Subject to any disclaimer, the term of this patent is extended or adjusted under 35 U.S.C. 154(b) by 492 days.

(21) Appl. No.: 14/272,025

(22) Filed: May 7, 2014

(65) Prior Publication Data
US 2015/0322817 A1    Nov. 12, 2015

(51) Int. Cl.
| | |
|---|---|
| F01D 5/06 | (2006.01) |
| F01D 25/06 | (2006.01) |
| F01D 25/12 | (2006.01) |
| F01D 5/02 | (2006.01) |
| F01D 5/30 | (2006.01) |
| F01D 11/00 | (2006.01) |

(52) U.S. Cl.
CPC .............. *F01D 25/06* (2013.01); *F01D 5/066* (2013.01); *F01D 25/12* (2013.01); *F01D 5/026* (2013.01); *F01D 5/3015* (2013.01); *F01D 11/001* (2013.01); *Y10T 29/4932* (2015.01)

(58) Field of Classification Search
CPC ....... F01D 5/066; F01D 11/001; F01D 11/005
USPC ........................................................ 29/889.2
See application file for complete search history.

(56) References Cited

U.S. PATENT DOCUMENTS

| | | | | |
|---|---|---|---|---|
| 3,888,602 A * | 6/1975 | Nichols | ............... | F01D 5/06 416/198 A |
| 4,306,834 A * | 12/1981 | Lee | ............... | F01D 11/04 415/116 |
| 5,134,844 A * | 8/1992 | Lee | ............... | F01D 5/08 415/116 |
| 6,151,881 A * | 11/2000 | Ai | ............... | F01D 5/081 415/115 |
| 7,147,436 B2 * | 12/2006 | Suciu | ............... | F01D 5/025 415/216.1 |
| 7,815,415 B2 * | 10/2010 | Kanezawa | ............... | F01D 9/06 415/170.1 |
| 8,439,637 B2 * | 5/2013 | DiBenedetto | ............... | F02C 3/107 415/229 |
| 8,662,845 B2 * | 3/2014 | Virkler | ............... | F01D 5/066 415/115 |
| 2011/0116931 A1 * | 5/2011 | Dessoly | ............... | F01D 5/066 416/204 A |

* cited by examiner

*Primary Examiner* — Kevin Murphy

(57) ABSTRACT

Disclosed is a method to minimize rotor vibration of a gas turbine. According to the method an air separator is attached to the rotor, an interference is determined between the air separator and a turbine disc of the rotor, and the interference is adjusted in the range of 0.020 and 0.060 inches. Further disclosed is rotor for a gas turbine in which an axial interference between two parts attached to the rotor are in a range of 0.20 to 0.060 inches.

17 Claims, 4 Drawing Sheets

US 9,631,513 B2

VIBRATION OPTIMIZED ROTOR AND A METHOD FOR PRODUCING A VIBRATION OPTIMIZED ROTOR

FIELD

The present application relates to gas turbines, and more particularly to a method for minimizing rotor vibration of an air separator in a gas turbine, and a rotor of a gas turbine.

BACKGROUND

An air separator on a gas turbine separates cooling air into two paths; one path leads into the row one turbine disc for cooling of the row one blade platform and the other path leads to the rotor for cooling of the rotor discs. A row one turbine disc is also known as a first row disc. The axial interference between the air separator and the row one turbine disc has been identified as a potential contributor to vibrations of the rotor. Loose axial interference can cause misalignment of rotor parts allowing them to move during operation or between starts causing excessive vibration. Excessive vibration, vibration above an acceptable threshold. can cause damage to the gas turbine with the damage sometimes severe enough to cause the gas turbine to be shut down. In the event of a gas turbine shutdown due to vibration excursions, the life of the turbine components may be reduced. General long term operation at high vibration levels may cause damage to the turbine and the components including the rotor, requiring early replacement or repair.

SUMMARY

Briefly, aspects of the present disclosure relate to a rotor and a method to minimize rotor vibration due to movement of the air separator of a gas turbine.

In one aspect, there is provided a method for minimizing the rotor vibration of a gas turbine. The method includes attaching an air separator to a rotor. The attaching includes determining an interference between the air separator and a turbine disc and adjusting the interference to the range 0.020 to 0.060 inches.

In another aspect, there is provided a rotor for a gas turbine, the rotor includes a compressor section comprising a plurality of rows of blades, an intermediate section including an air separator and a torque tube, and a turbine section downstream of the intermediate section comprising a plurality of blade rows. The rotor includes an axial interference between the air separator and a row one turbine disc in a range of 0.020 to 0.060 inches.

DETAILED DESCRIPTION OF THE INVENTION

Clearance may be defined as the distance between parts whereas interference may be defined as the amount of overlap between parts. Interference produces a fastening or fit between two parts by friction after the parts are pushed together. The friction that holds the parts together may be increased by compression of one part against the other. Interference describes the tightness between the parts being pushed together.

It has been determined that the interference between the air separator and the row one turbine disc has been insufficient. Moreover, it has been determined to be insufficiently loose. In an effort to reduce vibrations, it has been recognized by the inventors that an interference between 0.020 to 0.060 inches provides a tighter fit reducing vibrations without overly compressing the air separator. Too much compression of the parts would cause premature failure of the air separator and potentially also adjacent components.

Figure 1:
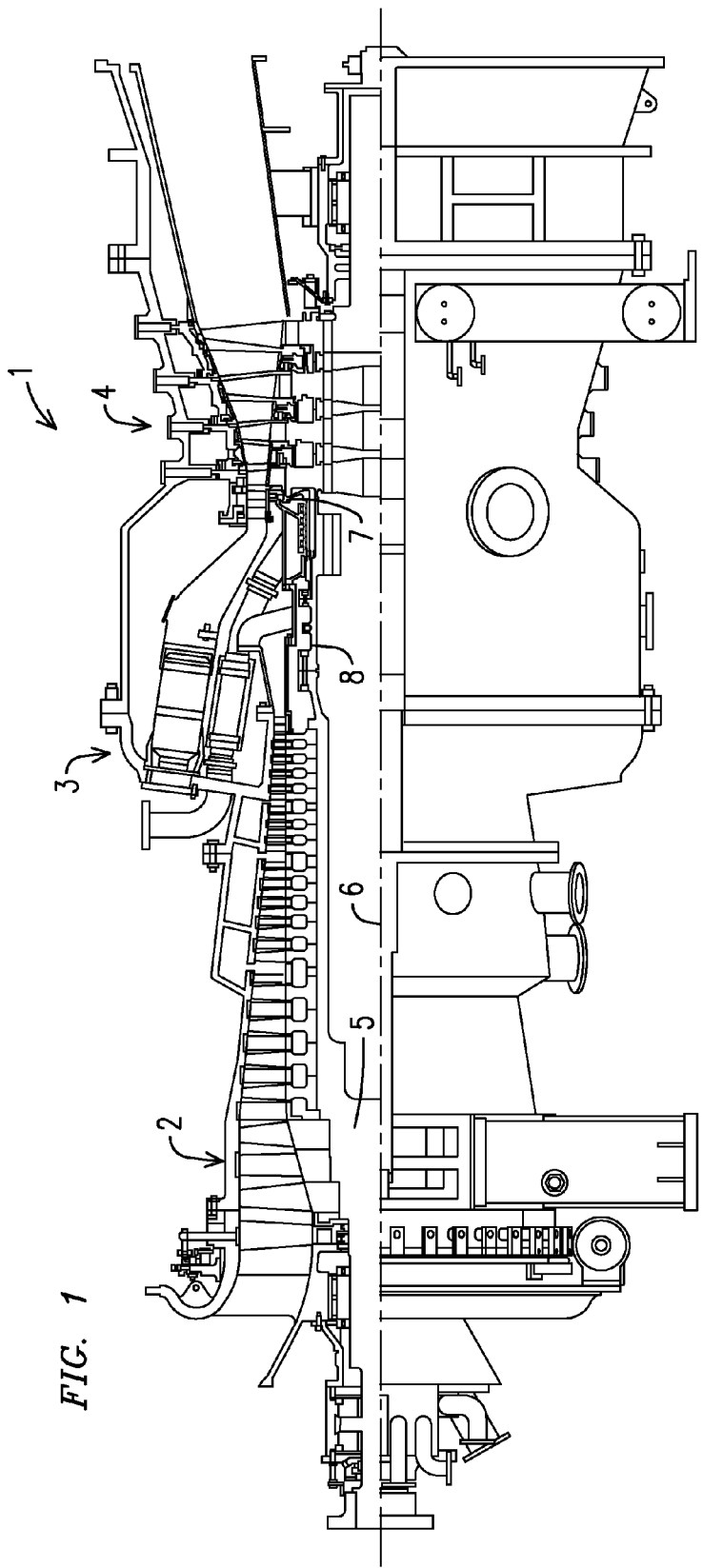
FIG. 1 illustrates a longitudinal view of gas turbine.

In an embodiment, a gas turbine (1) includes a compressor section (2), an intermediate section (3), and a turbine section (4) as shown in FIG. 1. The intermediate section (3) includes an air separator (7) and a torque tube (8). The air separator (7) separates the air into two path as described above and the torque tube transfers torque (or power) between compressor and turbine sections. A rotor (5) is arranged along a centerline (6) of the gas turbine (1).

Figure 2:
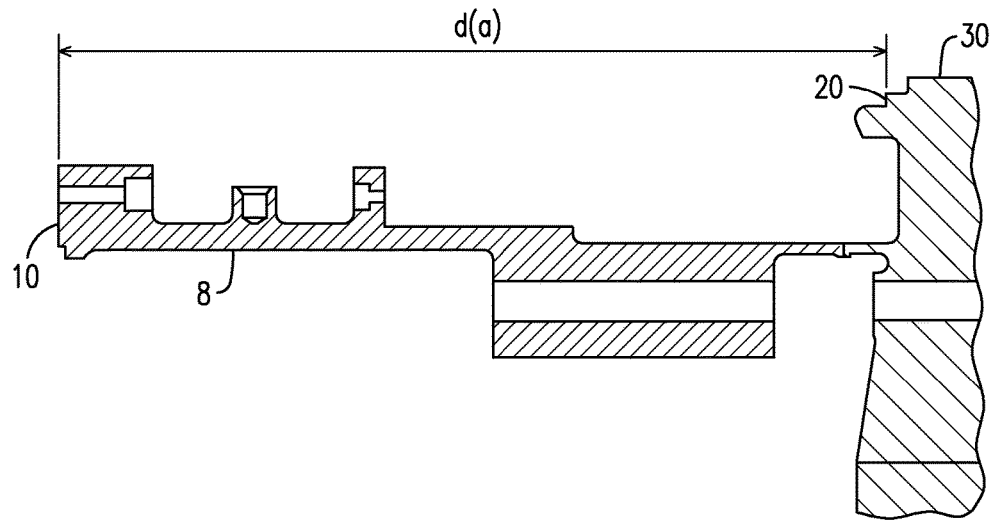
FIG. 2 illustrates an axial partial view of rotor assembly with the torque tube installed.

FIG. 2 shows an embodiment of the rotor (5) with a torque tube (8) and the rotor one disc (30) without the air separator installed so that no interference, or overlap, exists between the parts attached to the rotor (5). A length of the rotor assembly may be defined as a distance d(a) between a torque tube adaptor coupling face (10) and the row one disc inlet face (20).

Figure 3:
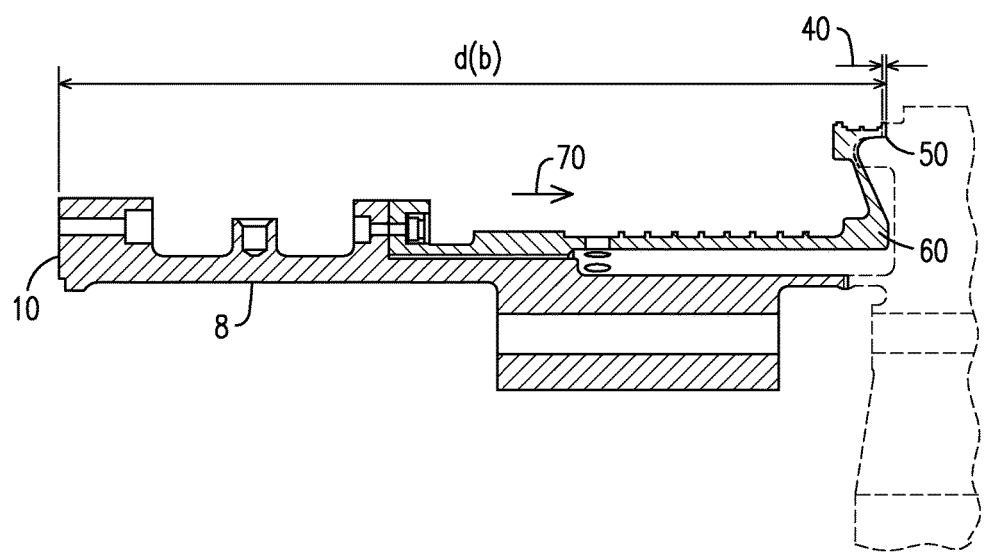
FIG. 3 illustrates a partial axial view of the rotor assembly with the air separator also installed.

FIG. 3 shows a similar embodiment of a rotor arrangement with the addition of an installed air separator (60). The length of the rotor assembly may be defined as the distance d(b) between the torque tube adaptor coupling face (10) and an air separator end face (50). The air separator end face (50) abuts the row one disc inlet face (20) and the compression of the parts when the air separator is installed creates an axial interference (40) between the air separator and the row one disc inlet face (20).

In an embodiment, the air separator (60) is pushed downstream (70) to produce an increase in the interference between the air separator (60) and the row one turbine (30). It would be understood that the pushing downstream may be achieved in various ways. For example, material may be added between the air separator (60) and the torque tube (8) in order to push the air separator downstream.

A layer of material of the air separator (60) at an end face may be removed. The layer may be removed, for example, when the interference (40) is still too tight after pushing the air separator (60) downstream. For example a machining operation may be used to "true up" the end face also known as a skim cut. Thus, a layer of material of the air separator (60) may be removed so that the interference lies within the range of 0.020 and 0.060 inches. The layer may be removed to create a planar surface. A planar surface may produce a more consistent interference between the air separator (60) and the row one turbine disc (30).

Figure 4:
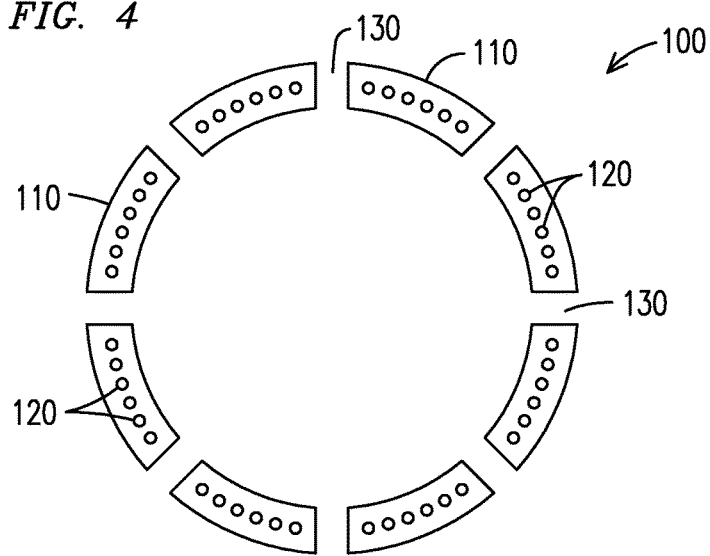
FIG. 4 illustrates a plan view of a bushing component.

In an embodiment, as illustrated by FIG. 4, a bushing component (100) is used to push the air separator (60) downstream. The addition of the bushing component (100) on a torque tube face pushes the air separator downstream increasing the axial interference between the air separator (60) and the row one turbine (30). A specified thickness for the bushing component (100) may be determined to push the air separator (60) downstream. The thickness of the bushing component may be in a range of 0.040-0.120 inch. Multiple bushing components may be applied to achieve the interference (40) range of 0.020 to 0.060 inches. The interference (40) can then be calculated with the bushing component (100) installed.

In the embodiment shown in FIG. 4, eight circumferential bushing segments (110) are separated by a space (130). It would be understood, however, that the number of segments is for illustrative purposes and that the bushing component (100) may have more or less segments than illustrated. Furthermore, it would be understood that in other embodiments the bushing component (100) may be a unitary structure without segments.

In an embodiment, the bushing component (100) includes at least the number of holes (120) provided on the torque tube (8). Each hole (120) is configured to mate with a corresponding hole on the torque tube face through which a spindle bolt may be attached to hold the segment (110) to the torque tube (8). It would be understood that this bushing component (100) may include more or less holes than provided on the torque tube (8).

In certain embodiments, each bushing segment (110) includes at least one hole (120) in order to mount the bushing segment (110) to the torque tube (8). In a particular embodiment, sixty coupling holes (140) are provided in the torque tube face. Thus, the range of the number of bushing segments (110) may be from 1 to 60 such that each segment includes at least one hole (120). One skilled in the art would understand that on the one hand having 60 segments would require more effort to manually position 60 segments. On the other hand, a unitary bushing component (100) without segments, would not provide any space between the bushing segments (110) for thermal expansion when the gas turbine is operating under normal conditions. The fewer segments used results in fewer number of spaces. When there are fewer spaces the more likely the segments would interfere with one another and cause a misalignment. In an embodiment, a circumferential spacing of between 1/16" to 3/8" (130) between segments allows for adequate thermal expansion of the segments during normal operation of the turbine.

Each hole (120) should also allow for thermal expansion. For example, each hole of the segment is 1/16" to 1/4" greater than the corresponding coupling hole (140) in the torque tube (8) to allow for thermal expansion.

Figure 9:
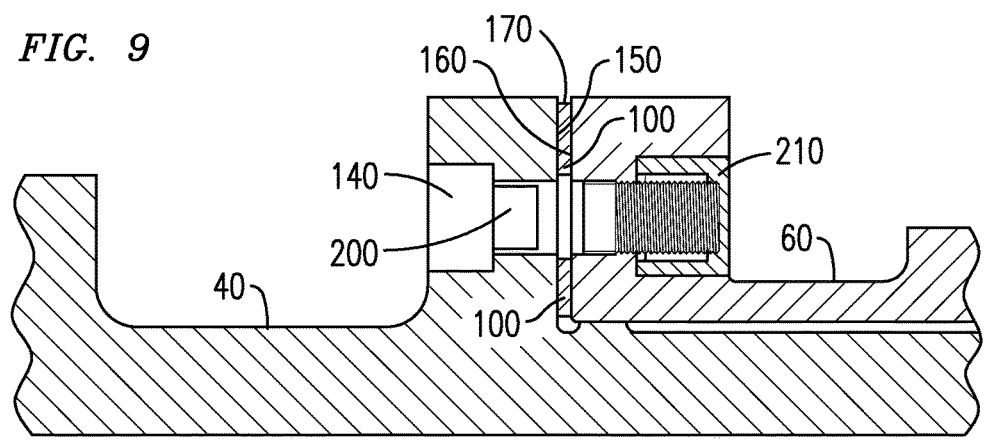
FIG. 9 illustrates an axial view of the torque tube including the air separator coupling holes with the coupling bolts installed.

The bushing segment's inner radial dimension in the embodiment shown in FIG. 9 is 1/16" above the air separator flange (220) and the bushing segment's outer radial dimension is 1/16" below the air separator flange (230). The dimensions could go as high as 3/8" above the flange and 3/8" below the flange, respectfully, in another embodiment.

A method to minimize rotor vibration is also provided. When the interference is too loose during normal operation of the gas turbine the air separator and row one turbine disc can become misaligned allowing these parts to move during operation or between starts. This movement causes vibration which due to the vibration, the long term life of these parts may be reduced requiring early replacement.

The method includes pushing the air separator (60) further downstream in order to achieve an axial interference between the air separator (60) and the row one turbine disc (30) of between 0.020 to 0.060 inches. Thus, the air separator (60) would not need to be replaced during rotor refurbishment using the method provided. This will reduce the cost of the refurbishment considerably.

Figure 5:
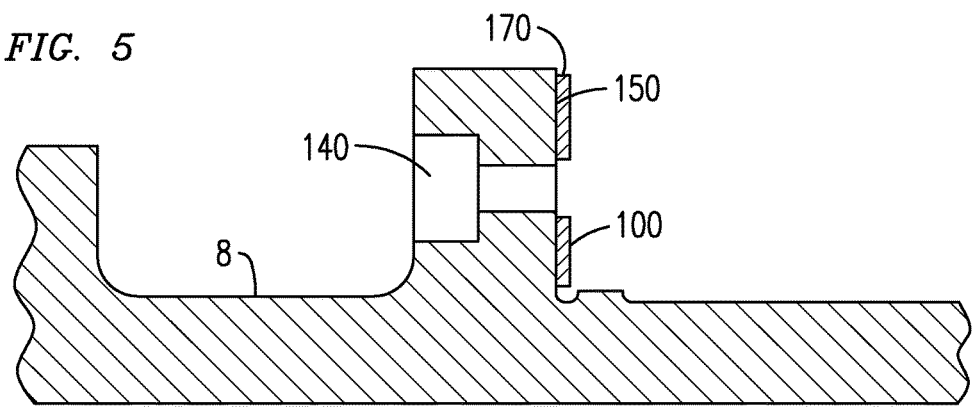
FIG. 5 illustrates an axial view of the torque tube including coupling hole and the bushing component.

FIG. 5 shows a cross sectional view of the torque tube (8) including a coupling hole (140) and the bushing component (100) according to an embodiment. The bushing component (100) is placed on a face (150) of the torque tube (8) which includes coupling holes (140) into which spindle bolts are fastened, pushing the air separator (60) further downstream. From this perspective view and in this embodiment, the radial edge geometry (170) of the bushing component is square. A square radial edge would be easy to produce. It would be understood that other geometries may be used.

In an embodiment, the rotor is in a vertical position in order to remove and/or install the air separator (60). The vertical positioning of the rotor (5) allows precise alignment of the parts during assembly and disassembly.

Figure 8:
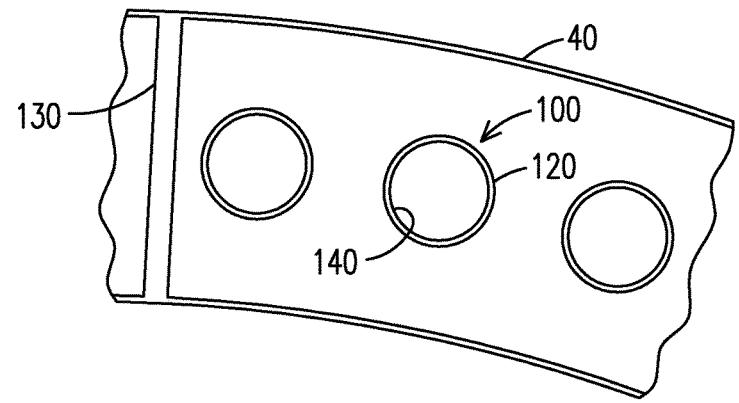
FIG. 8 illustrates a plan view of the bushing component centered on top of the torque tube face.

A first measurement (a) is taken from the torque tube adaptor coupling face (10) to the row one disc inlet face (20). The measurement may be taken using various measurement instruments including but not limited to calipers, a straight edge, a granite table, and a height gauge. This distance is shown in FIG. 1 as d(a). The bushing segments (110) are then installed on a torque tube face (150) by roughly centering each segment about the coupling holes (140) in the torque tube face (150) as shown in FIG. 8. In the embodiment shown in FIG. 8, the bushing holes (120) are shown centered above the coupling holes (140) on the torque tube (40). In the embodiment shown in FIG. 9, each bushing hole (120) of the plurality of holes includes a size 1/16" greater radially than a coupling hole (140) size of a spindle bolt. Alternatively, the bushing hole (120) could go as much as 1/4" greater than the coupling hole (140).

During assembly, the bushing component (100) may be placed and centered on the torque tube (8) prior to the fastening of the spindle bolts. Each spindle bolt fits into a corresponding coupling hole (140) and through a corresponding bushing hole (120) in the bushing segment (110).

Figure 6:
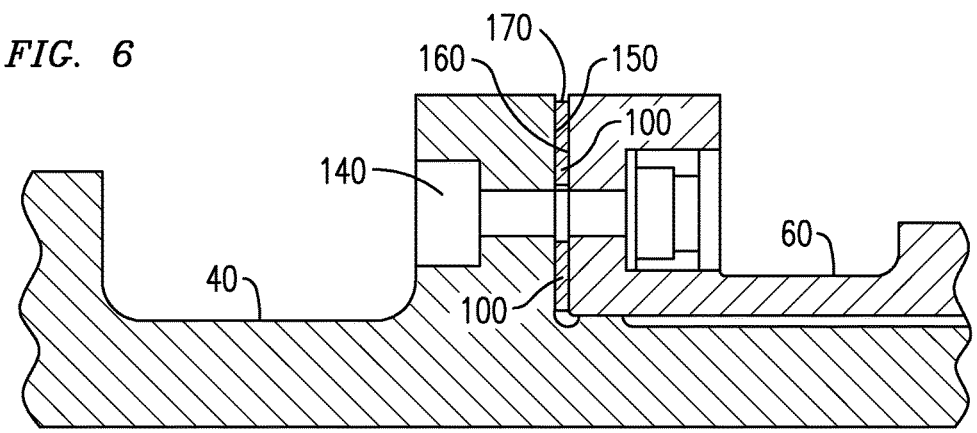
FIG. 6 illustrates an axial view of the torque tube including the coupling hole, the bushing component, and the installed air separator.

The air separator (60) is installed at this point without the spindle bolts. A cross sectional view of the bushing component (100) installed between a torque tube face (150) and an air separator face (160) is shown in FIG. 6. The installation of the air separator creates an axial interference between the air separator and the row one turbine disc. A second measurement (b) is now taken using the same measurement instrument as that used to take the first measurement from the torque tube adaptor coupling face (10) to an air separator face (50) which abuts the row one inlet face (70). This distance is shown in FIG. 3 as d(b).

Figure 7:
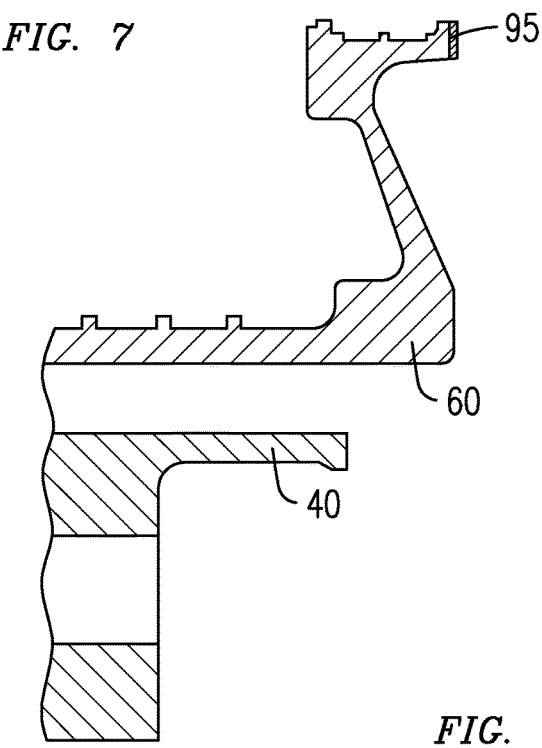
FIG. 7 illustrates an axial view of the air separator, torque tube, and air separator end face and layer.

The second distance d(b) is subtracted from the first distance d(a) in order to obtain the axial interference value for the air separator to the row one turbine disc. If the axial interference is more than an acceptable range, for example, or if the interference is too tight, or if the end face is not planar, a layer of the end face of the air separator may be removed creating a flat, planar surface. For example, machined using a CNC VBM machine (computer numerical control vertical bore mill) in order to remove a layer of the end face of the air separator (50). A flat planar surface may help produce a consistent interference at all contact points between the air separator and the end face of the separator. In an embodiment shown in FIG. 7, a layer of the air separator end face (95) is shown. The maximum thickness that may be machined is 0.090 because any more that this may impact the structural integrity of the air separator. If the axial interference is less than the desired range, a second bushing component (100) may be installed directly behind the first bushing component. Each bushing component has a thickness in the range of 0.040 to 0.120 inch. In the illustrated embodiment of FIG. 8, the thickness of the bushing component is 0.060 inch.

FIG. 9 shows an axial view of the torque tube and air separator with the coupling bolt (200) installed into the coupling hole (140) and with the coupling nut (210) installed into the corresponding coupling hole in the air separator (7). The coupling nut (210) is fastened onto coupling bolt (200).

While specific embodiments have been described in detail, those of ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "include" and "comprising" as well as derivatives thereof, mean inclusion without limitation; the use of articles "a" or "an" does not exclude a plurality, and the term "multiple" refers to "a plurality of", i.e., more than one.

What is claimed:

1. A method to minimize rotor vibration of a gas turbine rotor, comprising:
    attaching an air separator to the rotor; the attaching comprising:
        determining an interference between the air separator and a rotor one disc, and
        adjusting the interference to the range of 0.020 to 0.060 inches,
    wherein the adjusting comprises pushing the air separator downstream toward the rotor one disc,
    wherein the pushing comprises installing a bushing component with a thickness circumferentially on a torque tube face in order to increase the axial interference between the air separator and the rotor one disc, and
    wherein the bushing component is installed between the air separator and the torque tube face.

2. The method as claimed in claim 1, wherein the adjusting further comprises removing a layer of an end face of the air separator creating a flat planar surface abutting the rotor one disc.

3. The method as claimed in claim 1, wherein the determining comprises:
    measuring a first distance from a coupling face of a torque tube adaptor to an inlet face of a rotor disc prior to the attaching of the air separator;
    measuring a second distance between the coupling face of the torque tube adaptor to an air separator face;
    subtracting the second distance from the first distance in order to obtain an axial interference value for the air separator to the turbine disc.

4. The method as claimed in claim 3, further comprising determining a thickness of the air separator to remove in order to achieve the axial interference.

5. The method as claimed in claim 1, wherein the bushing component comprises a plurality of bushing segments.

6. The method as claimed in claim 5, wherein a number of the plurality of bushing segments are interspersed around a circumference on the torque tube face.

7. The method as claimed in claim 5, wherein each of the plurality of segments includes a hole.

8. The method as claimed in claim 7, wherein a number of the plurality of bushing segments is 8.

9. The method as claimed in claim 7, wherein the installing of the bushing component includes for each of the plurality of segments centering the hole about a corresponding hole of a plurality of coupling holes in the torque tube.

10. The method as claimed in claim 9, further comprising installing a spindle bolt into each of the plurality of coupling holes through a corresponding hole in the plurality of holes in the plurality of bushing segments.

11. The method as claimed in claim 9, wherein each hole of the plurality of segments includes a size in a range of 1/16" to 1/4" greater than the corresponding coupling hole of the torque tube.

12. The method as claimed in claim 1, wherein the interference is between 0.030 to 0.050 inches.

13. A rotor for a gas turbine, comprising:
    a compressor section comprising a plurality of rows of blades;
    an intermediate section including an air separator and a torque tube;
    a turbine section comprising a plurality of rows of blades, wherein an axial interference between two parts attached to the rotor are in a range of 0.020 to 0.060 inches; and
    a bushing component,
    wherein the bushing component with a thickness is provided on the torque tube in order to increase the axial interference between the air separator and a row one turbine disc in the turbine section.

14. The rotor as claimed in claim 13, wherein the axial interference due to the installation of the air separator lies in a range of between 0.030 to 0.050 inches.

15. The rotor as claimed in claim 13, wherein the bushing component comprises a plurality of bushing segments.

16. The rotor as claimed in claim 15, wherein each of the plurality of bushing segments includes a bushing hole.

17. The rotor as claimed in claim 15, wherein a circumferential distance between adjacent segments is 1/16" to 3/8".

* * * * *